(12) United States Patent
Tokita

(10) Patent No.: US 11,144,189 B2
(45) Date of Patent: Oct. 12, 2021

(54) DETERMINATION AND RELOCATION OF MOVEMENT TARGETS BASED ON A DRAG-AND-DROP OPERATION OF A THUMBNAIL ACROSS DOCUMENT AREAS

(71) Applicant: CANON KABUSHIKI KAISHA, Tokyo (JP)

(72) Inventor: Ken Tokita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/692,020

(22) Filed: Nov. 22, 2019

(65) Prior Publication Data
US 2020/0174637 A1 Jun. 4, 2020

(30) Foreign Application Priority Data
Nov. 30, 2018 (JP) .............................. JP2018-225481

(51) Int. Cl.
| | |
|---|---|
| G06F 3/0486 | (2013.01) |
| G06F 3/0483 | (2013.01) |
| G06F 16/16 | (2019.01) |
| G06F 3/0481 | (2013.01) |
| G06F 3/0482 | (2013.01) |

(52) U.S. Cl.
CPC .......... *G06F 3/0486* (2013.01); *G06F 3/0482* (2013.01); *G06F 3/0483* (2013.01); *G06F 3/04817* (2013.01); *G06F 16/168* (2019.01); *G06F 2203/04803* (2013.01)

(58) Field of Classification Search
CPC .. G06F 3/0486; G06F 3/0482; G06F 3/04817; G06F 3/0483; H04N 1/00442
See application file for complete search history.

(56) References Cited

U.S. PATENT DOCUMENTS

| | | | | |
|---|---|---|---|---|
| 7,685,517 | B2* | 3/2010 | Tomita | G06F 40/166 |
| | | | | 715/276 |
| 8,689,100 | B2* | 4/2014 | Tomita | G06F 40/166 |
| | | | | 715/255 |
| 9,990,465 | B2* | 6/2018 | Kishimoto | H04N 1/00413 |
| 10,248,369 | B2* | 4/2019 | Krikke | G06F 3/1256 |
| 10,489,044 | B2* | 11/2019 | Cummins | G06F 16/162 |
| 10,552,770 | B2* | 2/2020 | Brough | G06Q 10/109 |
| 2005/0289460 | A1* | 12/2005 | Tomita | G06F 40/166 |
| | | | | 715/255 |

(Continued)

FOREIGN PATENT DOCUMENTS

JP 2009-239595 A 10/2009

*Primary Examiner* — Abdullah Al Kawsar
*Assistant Examiner* — Kenny Nguyen
(74) *Attorney, Agent, or Firm* — Canon U.S.A., Inc. IP Division

(57) ABSTRACT

An apparatus and method for moving thumbnails on a screen is provided. In a case where thumbnails desired by a user among a displayed list of thumbnails are moved by a drag-and-drop operation, if the number of thumbnails as movement targets is large, it takes time to perform a selection operation. Where one of a plurality of thumbnails displayed as a list is dragged and dropped by a user, based on a drop position, a thumbnail group including the dragged thumbnail and thumbnails positioned on a first side of the dragged thumbnail or on a second side, opposite the first side, of the dragged thumbnail among the displayed list of thumbnails is determined as a movement target for subsequent movement thereof.

13 Claims, 14 Drawing Sheets

(56) References Cited

U.S. PATENT DOCUMENTS

| | | | | |
|---|---|---|---|---|
| 2008/0178120 | A1* | 7/2008 | Yamamoto | G06F 16/50 |
| | | | | 715/838 |
| 2010/0128293 | A1* | 5/2010 | Tomita | G06F 40/166 |
| | | | | 358/1.9 |
| 2013/0174069 | A1* | 7/2013 | Lee | G06F 3/04817 |
| | | | | 715/769 |
| 2014/0304631 | A1* | 10/2014 | Wang | G06F 3/0488 |
| | | | | 715/765 |
| 2016/0034574 | A1* | 2/2016 | Kang | H04N 21/4438 |
| | | | | 715/720 |
| 2016/0313893 | A1* | 10/2016 | Xu | G06F 3/0482 |
| 2016/0357383 | A1* | 12/2016 | Cummins | G06F 3/04817 |
| 2017/0060506 | A1* | 3/2017 | Krikke | G06F 3/1263 |
| 2017/0270248 | A1* | 9/2017 | Kishimoto | G16H 10/60 |
| 2018/0136810 | A1* | 5/2018 | Martin | G06F 3/1256 |
| 2018/0330291 | A1* | 11/2018 | Brough | G06F 3/0482 |
| 2018/0342226 | A1* | 11/2018 | Shin | H04M 1/0266 |

* cited by examiner

FIG.10
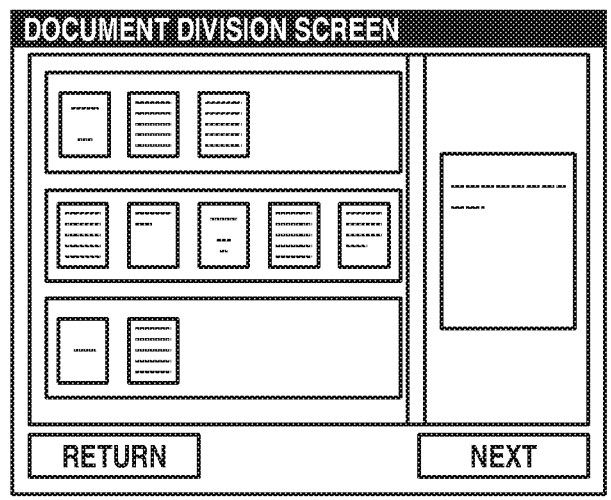
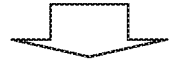
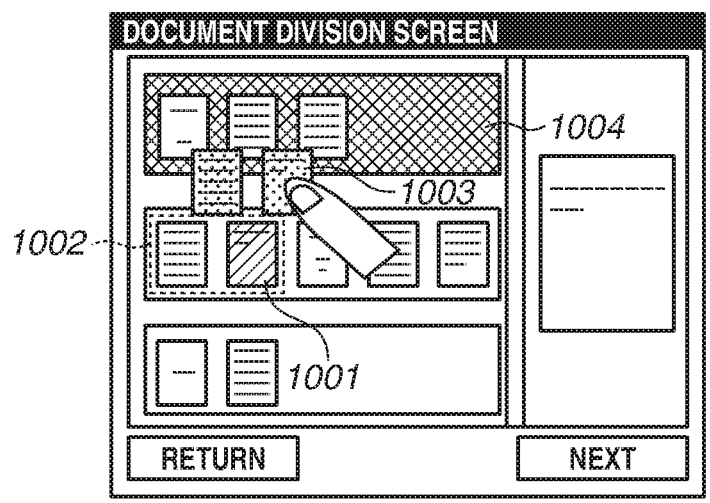
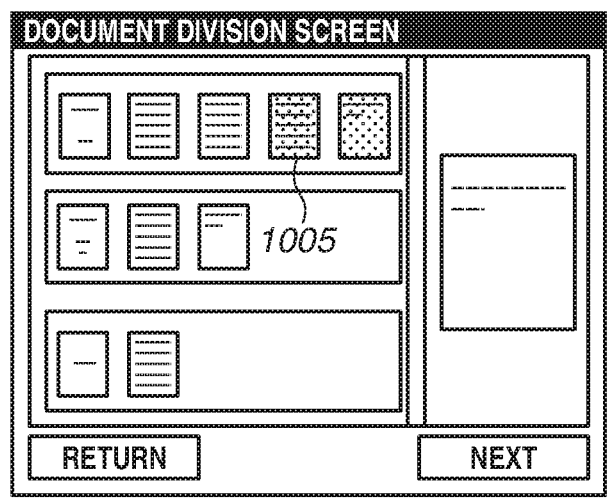

FIG.12
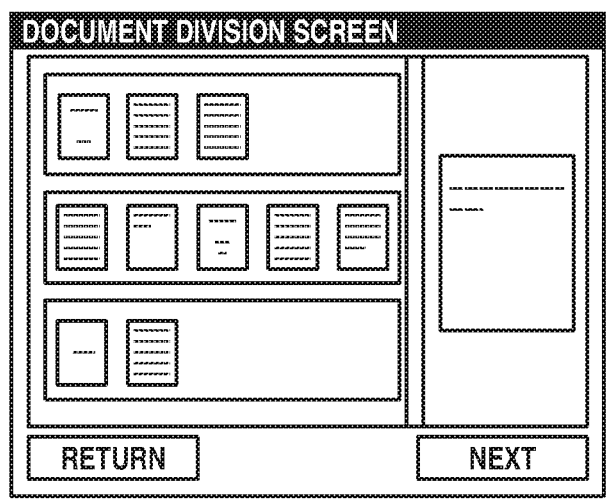
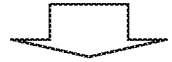
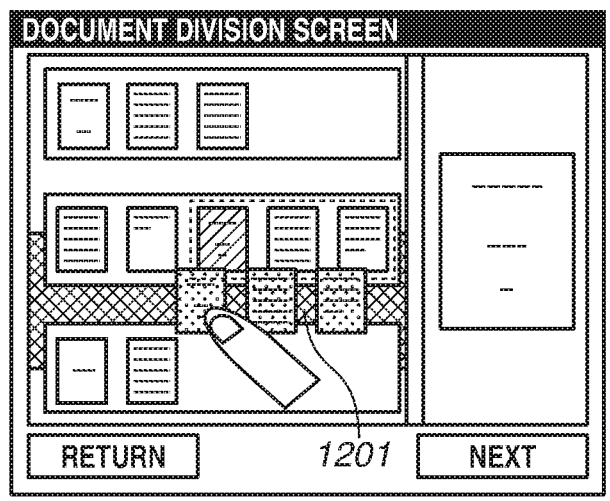
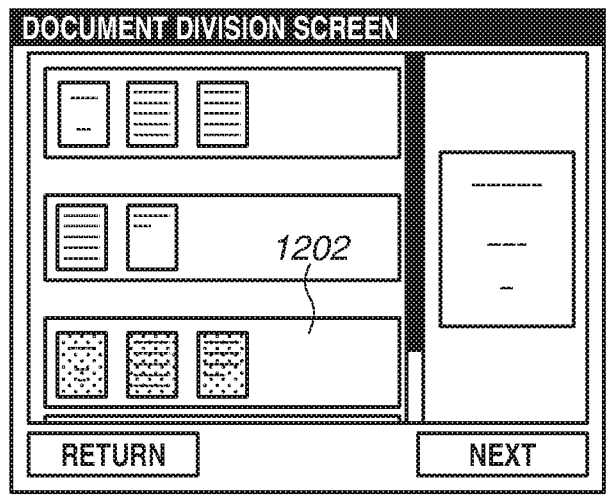

DETERMINATION AND RELOCATION OF MOVEMENT TARGETS BASED ON A DRAG-AND-DROP OPERATION OF A THUMBNAIL ACROSS DOCUMENT AREAS

BACKGROUND

Field of the Disclosure

The present disclosure relates to processing performed when a drag-and-drop operation is carried out on a thumbnail desired by a user among a displayed list of thumbnails.

Description of the Related Art

Conventionally, there is a method for scanning a paper document, converting scanned image data to an electronic file, and saving the file (the image data) at a specified location to manage the document. If there is a plurality of documents as scan targets, it is desirable to collectively scan the plurality of documents, put a plural pieces of generated image data together for each document by an operation of a user, and edit pages among the documents.

The publication of Japanese Patent Application Laid-Open No. 2009-239595 discusses a method for displaying a list of the image data of pages of scanned documents on a first page editing screen, and moving or copying the pieces of the image data on the first page editing screen to a second page editing screen by a drag-and-drop operation. This enables a user to separately edit pages with respect to each scanned document to generate a desired document file.

However, in the method of the publication of Japanese Patent Application Laid-Open No. 2009-239595, when the pieces of image data are moved between the page editing screens, a user needs to select all pieces of image data of pages which are movement targets and then carry out a drag-and-drop operation, or drag and drop the pieces of image data of the pages as the movement targets one by one. Thus, if the number of pieces of image data of pages as movement targets is large, the user takes time to perform the operation for selecting the pieces of image data of the pages as the movement targets.

SUMMARY

The present disclosure is directed to improving the operability of the drag-and-drop operation on a displayed list of thumbnails.

According to an aspect of some embodiments, a device includes a memory, and a processor in communication with the memory, wherein the processor performs, in a case where one of a plurality of thumbnails included in a first area, which is dragged and dropped by a user, is positioned within a second area, an operation for moving a thumbnail group including the dragged thumbnail and thumbnails on a first side of the dragged thumbnail among the plurality of thumbnails included in the first area, to the second area, and in a case where one of the plurality of thumbnails included in the first area, which is dragged and dropped by the user, is positioned within a third area, an operation for moving a thumbnail group including the dragged thumbnail and thumbnails on a second side, opposite the first side, of the dragged thumbnail among the plurality of thumbnails included in the first area, to the third area.

Further features of various embodiments will become apparent from the following description of exemplary embodiments with reference to the attached drawings.

BRIEF DESCRIPTION OF THE DRAWINGS

FIG. 10 is a diagram illustrating transitions of the screen when the document division process is performed.
FIG. 12 is a diagram illustrating transitions of the screen when the document division process is performed.

DESCRIPTION OF THE EMBODIMENTS

With reference to the drawings, exemplary embodiments for carrying out a present disclosure will be described below. The following exemplary embodiments do not limit the disclosure according to the appended claims, and not all the combinations of the features described in the exemplary embodiments are essential for a method for solving the issues in the disclosure.

Figure 1:
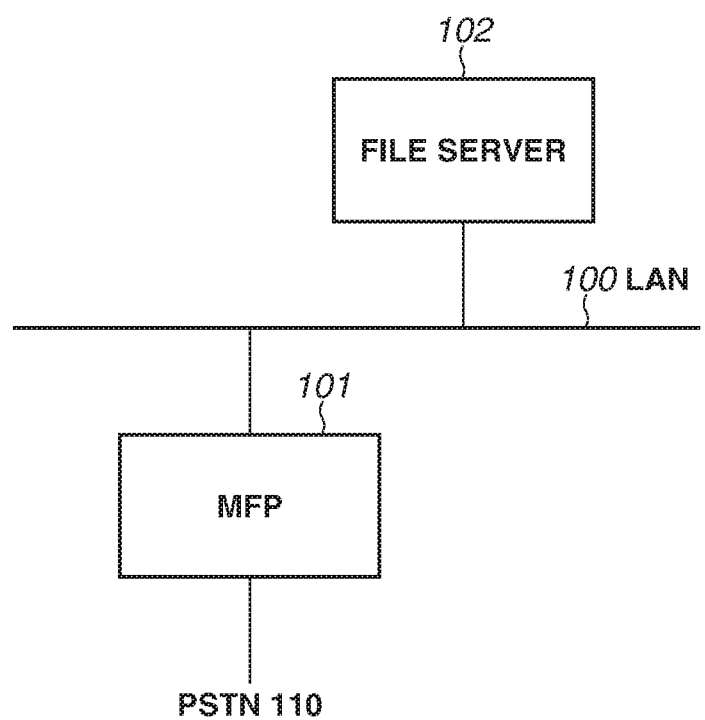
FIG. 1 is a diagram illustrating an entirety of a system.

A first exemplary embodiment is described. FIG. 1 is a diagram illustrating the entirety of an image processing system. On a local area network (LAN) 100, a multifunction peripheral (MFP) 101 and a file server 102 are connected to each other via the network and can communicate with each other. The MFP 101 is an example of an image processing apparatus (an electronic file generation apparatus).

The file server 102 is an example of an external server. While the entire system including the MFP 101 and the file server 102 is the image processing system in this case, only the MFP 101 can also be referred to as the "image processing system". While the apparatuses are connected to each other via a LAN in FIG. 1, the apparatuses may be connected to each other via the Internet.

The MFP 101 is connected to a public switched telephone network (PSTN) 110 and can conduct communication with respect to image data by facsimile using a facsimile apparatus (not illustrated).

Figure 2:
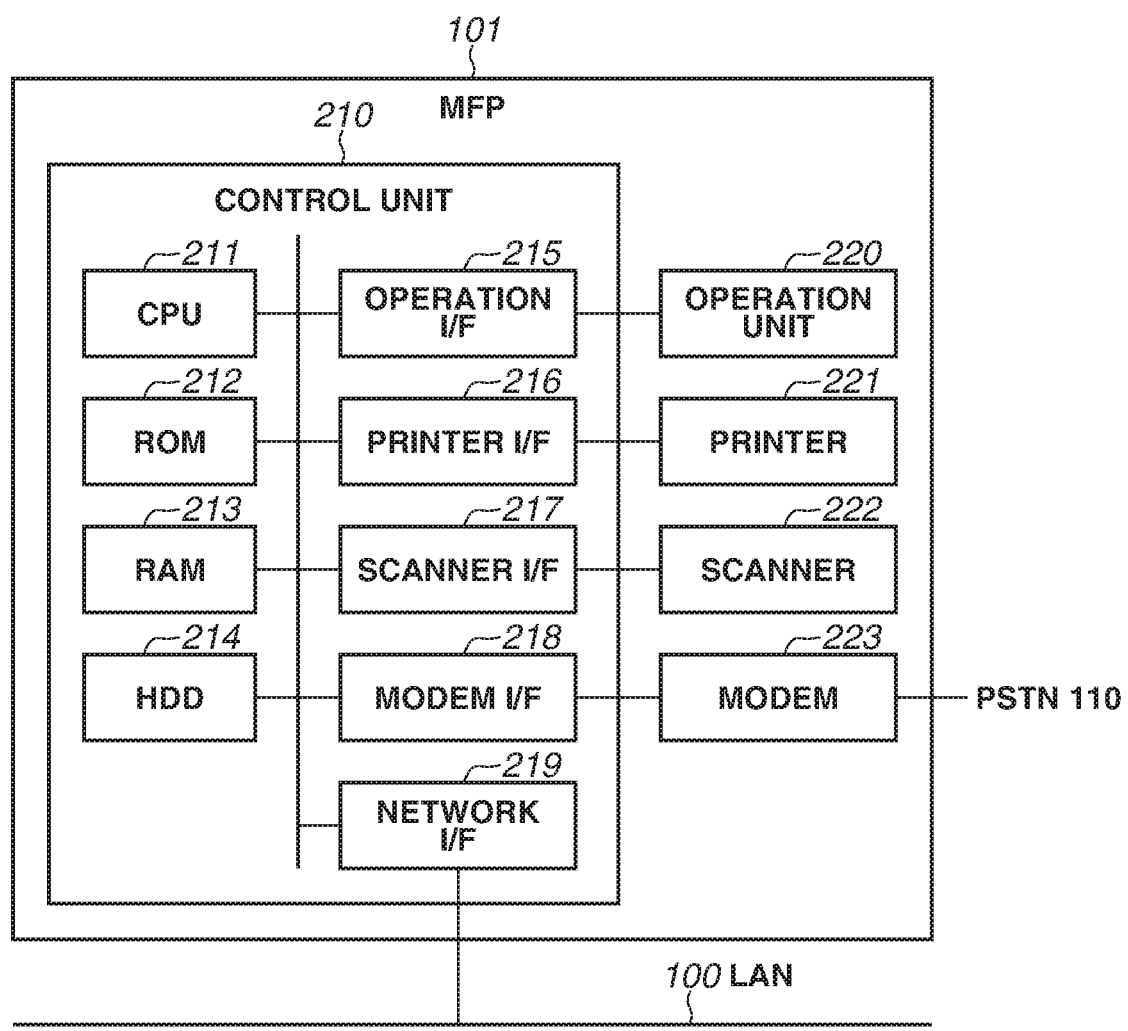
FIG. 2 is a hardware configuration diagram of a multi-function peripheral (MFP).

FIG. 2 is a hardware configuration diagram of the MFP 101. A control unit 210 including a central processing unit (CPU) 211 controls the operation of the entirety of the MFP 101. The CPU 211 reads a control program stored in a read-only memory (ROM) 212 and performs various types of control of the operations of the MFP 101, such as scanning, printing, and communication. The CPU 211 further functions as a processing unit that performs processes in flowcharts described below. A random-access memory (RAM) 213 is used as a temporary storage area such as a main memory or a work area for the CPU 211. In the MFP 101, a single CPU 211 executes the processes illustrated in the flowcharts described below, using a single memory (the RAM 213 or a hard disk drive (HDD) 214). Alternatively, another form may be employed. For example, a plurality of CPUs and a plurality of RAMs or HDDs can also cooperate to execute the processes illustrated in the flowcharts.

The HDD 214 stores image data and various programs.

An operation unit interface (I/F) 215 connects an operation unit 220 and the control unit 210. The operation unit 220 includes a liquid crystal display unit having a touch panel function and a keyboard, and functions as a unit that receives an operation instruction input by a user.

A printer I/F 216 connects a printer 221 and the control unit 210. Image data to be printed by the printer 221 is transferred from the control unit 210 to the printer 221 via the printer I/F 216 and printed on a recording medium by the printer 221.

A scanner I/F 217 connects a scanner 222 and the control unit 210. The scanner 222 reads a document to generate image data, and inputs the image data to the control unit 210 via the scanner I/F 217. The MFP 101 can convert the image data generated by the scanner a file, and transmit the converted file or email the file.

A modem I/F 218 connects a modem 223 and the control unit 210. The modem 223 carries out communication with respect to image data by facsimile using the facsimile apparatus (not illustrated).

A network I/F 219 connects the control unit 210 (the MFP 101) to the LAN 100. Using the network IN 219, the MFP 101 transmits image data and information to an external apparatus (the file server 102) on the LAN 100 and receives various information from the external apparatus.

Figure 3:
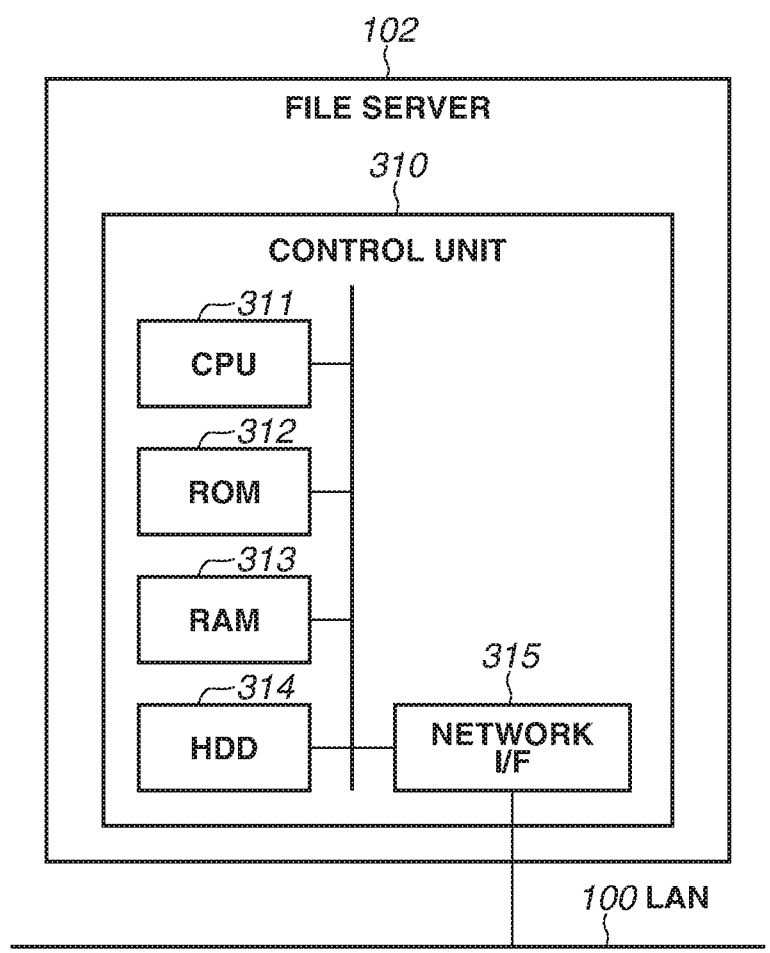
FIG. 3 is a hardware configuration diagram of a file server.

FIG. 3 is a hardware configuration diagram of the file server 102. A control unit 310 including a CPU 311 controls the operation of the entirety of the file server 102. The CPU 311 reads a control program stored in a ROM 312 and executes various control processes. A RAM 313 is used as a temporary storage area such as a main memory or a work area for the CPU 311. An HDD 314 stores a file of image data and various programs.

A network I/F 315 connects the control unit 310 (the file server 102) to the LAN 100. Using the network I/F 315, the file server 102 transmits and receives various information to and from another apparatus on the LAN 100.

Figure 4:
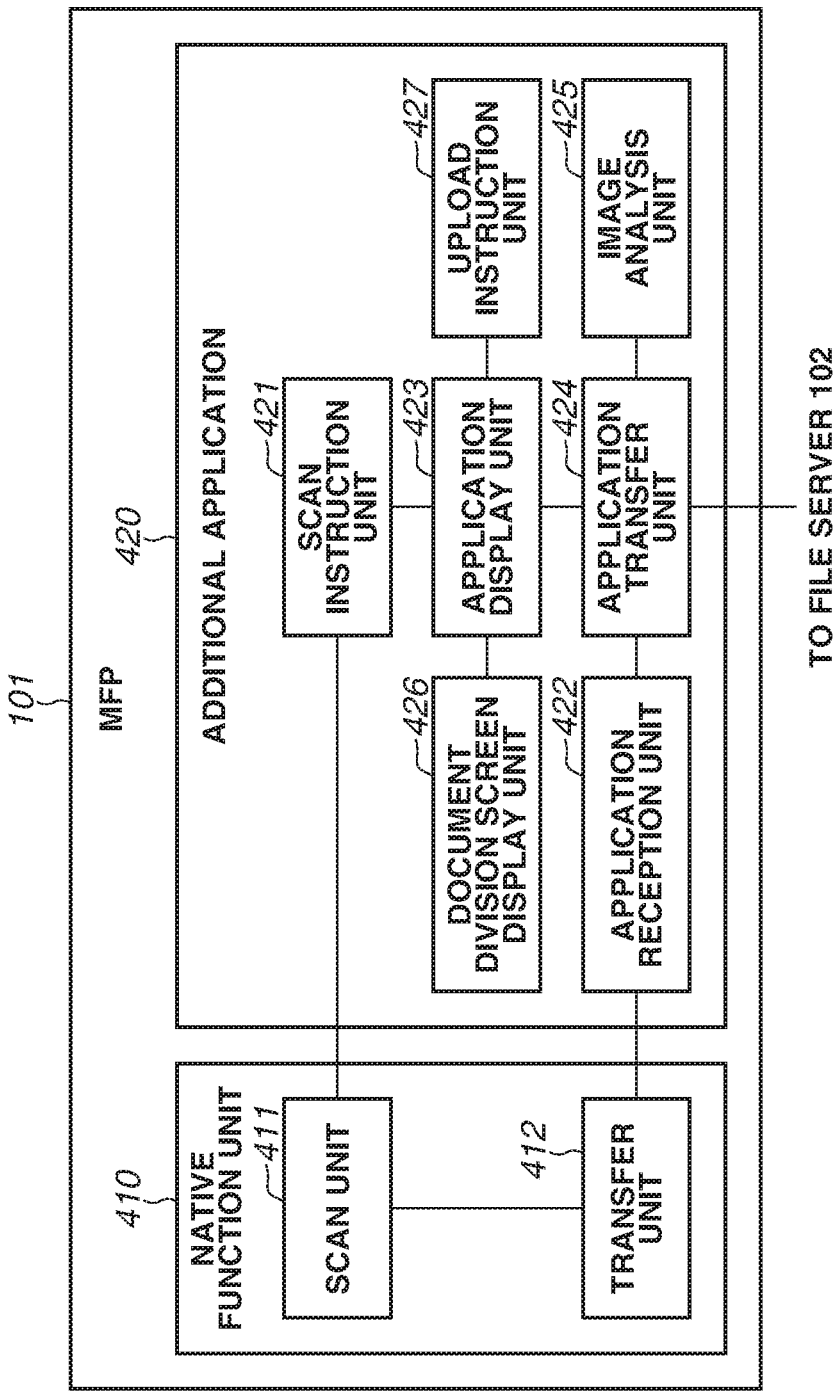
FIG. 4 is a software configuration diagram of the MFP.

FIG. 4 is a software configuration diagram of the MFP 101. The software configuration of the MFP 101 is broadly divided into two parts, namely a native function unit 410 and an additional application 420. Units included in the native function unit 410 are provided as standard in the MFP 101, whereas the additional application 420 is an application additionally installed on the MFP 101. The additional application 420 is an application based on Java (registered trademark) and can easily add a function to the MFP 101. Another additional application which is not illustrated may be installed on the MFP 101, or the native function unit 410 may include the function in advance.

An application display unit 423 displays, on the liquid crystal display unit having the touch panel function and included in the operation unit 220 of the MFP 101, a user interface (UI) for receiving an instruction input by the user. The details of the screen to be displayed will be described below.

A scan instruction unit 421 receives information input by the user through the application display unit 423, and together with scan settings and transfer settings included in the input information, requests a scan unit 411 to perform a scan process. The scan request includes a request identification (ID) for identifying a scan request that corresponds to the scanned image data received by an application reception unit 422 (described below) from a transfer unit 412.

An application transfer unit 424 temporarily saves file server setting information to be transferred (transmitted) to the file server 102.

If the scan request including the scan settings is received from the scan instruction unit 421, the scan unit 411 controls the scanner 222 via the scanner I/F 217 to read an image on a document, thereby generating image data. Then, the scan unit 411 passes the image data generated by reading the image and the transfer settings (including the request ID) to the transfer unit 412.

According to the transfer settings received from the scan unit 411, the transfer unit 412 transfers the image data received from the scan unit 411. In the present exemplary embodiment, the transfer destination of the image data is set such that all image data generated by the scan unit 411 are once transferred to the additional application 420. The transfer unit 412 has a File Transfer Protocol (FTP) client function, and according to FTP, internally transfers the image data and the request ID to the application reception unit 422 having an FTP server function.

The application reception unit 422 receives the image data and the request ID internally transferred from the transfer unit 412 and passes the image data and the request ID to the application transfer unit 424.

The application transfer unit 424 passes the received image data to an image analysis unit 425.

The image analysis unit 425 analyzes the feature of the image data and passes analysis information to the application transfer unit 424. The method for analyzing a feature amount will be described below.

The application transfer unit 424 passes the image data and the analysis information to the application display unit 423.

The application display unit 423 passes the received image data and analysis information to a document division screen display unit 426.

The document division screen display unit 426 displays, on the liquid crystal display unit having the touch panel function and included in the operation unit 220 of the MFP 101, a UI (a document division screen) regarding a document division setting for receiving an instruction operation input by the user. Then, based on an instruction operation performed by the user on the document division screen displayed by the document division screen display unit 426, the document division screen display unit 426 sets document division information so that the scanned image data including a plurality of pages is divided according to documents. The details of the document division screen will be described below.

An upload instruction unit 427 displays, on the liquid crystal display unit having the touch panel function and included in the operation unit 220 of the MFP 101, a UI regarding a folder path setting for receiving an instruction operation input by the user. The details of this screen to be displayed will be described below.

According to the document division information set in the document division screen display unit 426, the application display unit 423 divides the scanned image data including the plurality of pages for each document and generates an electronic file in a Portable Document Format (PDF) format or a Joint Photographic Experts Group (JPEG) format from the divided image data.

The application transfer unit 424 transfers the electronic file to a transmission destination generated combining the file server setting information temporarily saved in the request ID, and the folder path information set by the user.

When the transfer is completed, the application transfer unit 424 notifies the application display unit 423 that the transfer is completed. The application display unit 423 receives the notification from the application transfer unit 424 and updates the display content.

The application transfer unit 424 has a Server Message Block (SMB) client function. With the SMB function, the application transfer unit 424 performs a file operation and a folder operation using SMB, on the file server 102 having an SMB server function. The protocol used to transfer the file is not limited to SMB. Instead of SMB, for example, Web Distributed Authoring and Versioning (WebDAV) protocol for the World Wide Web (WWW), FTP, or Simple Mail Transfer Protocol (SMTP) can also be used. In addition to the above, Simple Object Access Protocol (SOAP) or Representational State Transfer (REST) for a purpose other than the transmission of the file can also be used.

Figure 5:
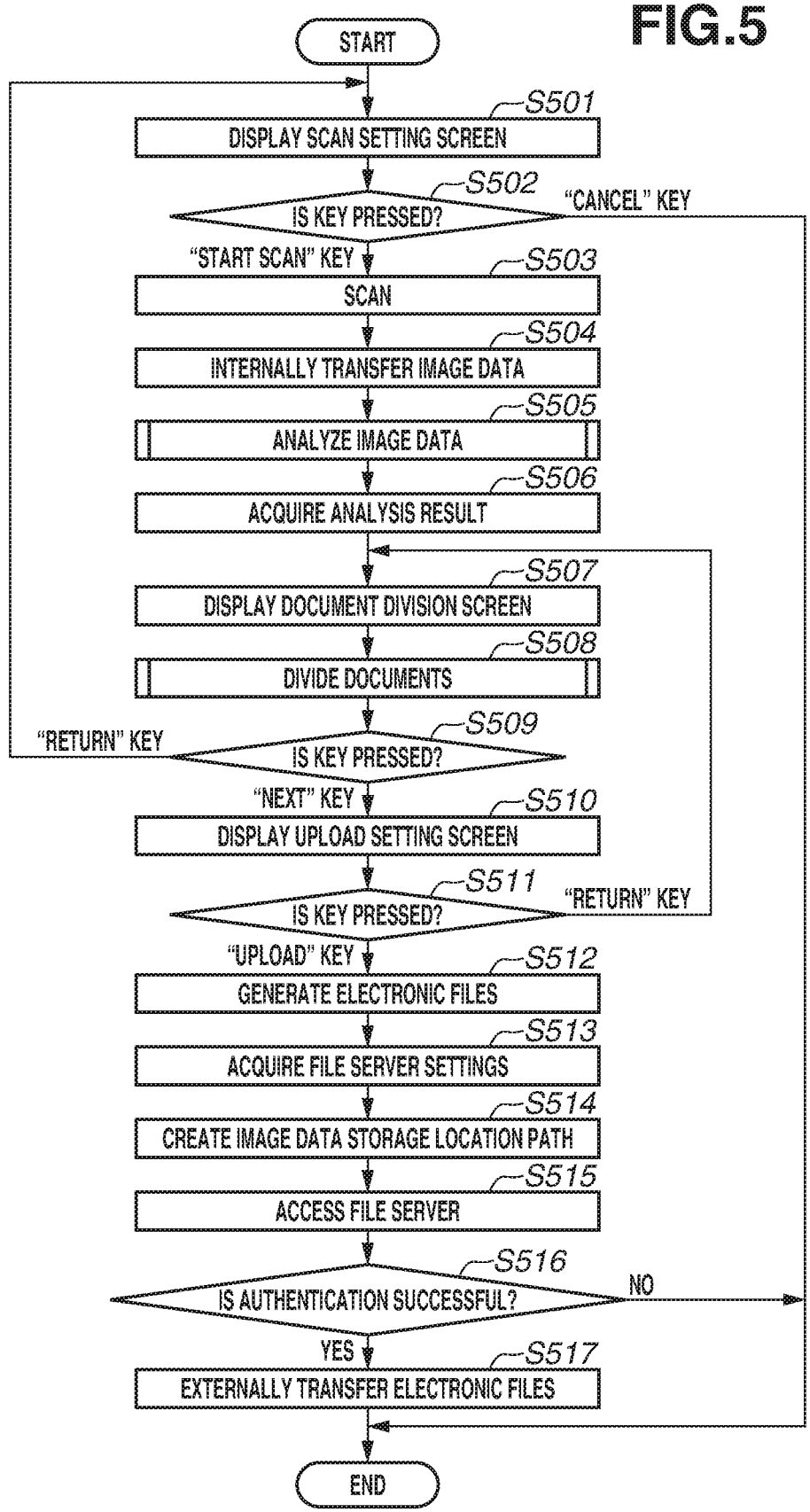
FIG. 5 is a flowchart illustrating a flow of a process of dividing scanned image data for each document and transferring the image data.
Figure 6:
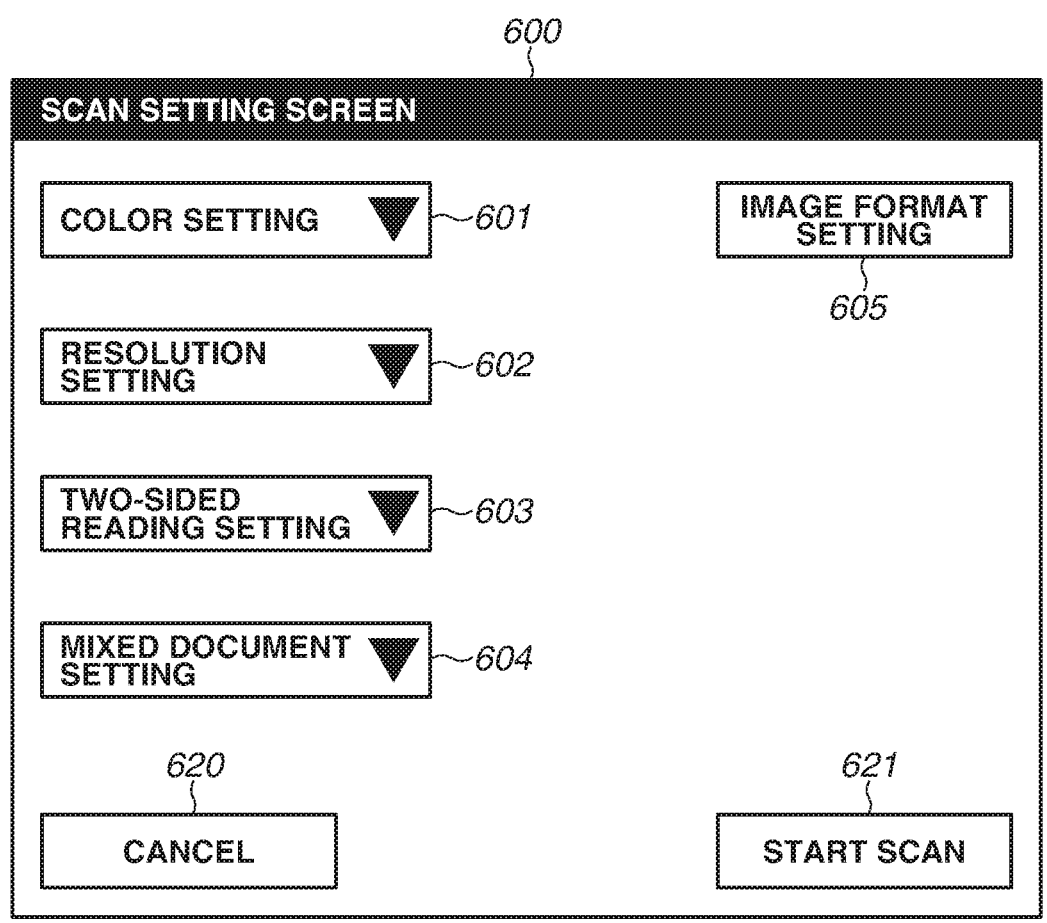
FIG. 6 is a diagram illustrating a scan setting screen.

FIG. 5 is a flowchart illustrating the operation in which the MFP 101 analyzes scanned image data, automatically divides the scanned image data for each document, displays the document division screen, changes a division position between documents, where necessary, converts the resulting documents to files, and then transfers the files to the file server 102. Operations (steps) illustrated in the flowchart in FIG. 5 are achieved by the CPU 211 of the MFP 101 executing a control program stored in the HDD 214. Not only the HDD 214 but also the RAM 213 may be used.

In step S501, the application display unit 423 displays a scan setting screen 600 on the operation unit 220.

Using keys 601 to 605 through the scan setting screen 600, the user of the MFP 101 makes settings regarding a scan operation to be performed by the scan unit 411 and gives an instruction to start a scan. The "color setting" key 601 receives a color setting (color/monochrome) when a document is scanned. The "resolution setting" key 602 receives a resolution setting when a document is scanned. The "two-sided reading setting" key 603 receives a two-sided reading setting when a document is scanned. The "mixed document setting" key 604 receives the setting of the presence or absence of mixed documents when a document is scanned. The "image format setting" key 605 receives an image format when a document is scanned. For each of these setting items using the scan setting keys 601 to 605, candidates are displayed in the range where the setting item can be executed by the scan unit 411. The user selects a desired setting from the displayed candidates. Some of the setting items described here may not exist, or setting items other than these setting items may exist.

In step S502, the application display unit 423 determines whether a "start scan" key 621 is pressed. If it is determined that the "start scan" key 621 is pressed, then in step S503, using the setting items selected using the scan setting keys 601 to 605, the scan instruction unit 421 transmits a scan request to execute a scan process. If it is determined that a "cancel" key 620 is pressed, then processing ends.

In step S504, image data scanned according to the scan request is internally transferred to the application reception unit 422 via the transfer unit 412 by using FTP.

In step S505, the image analysis unit 425 instructed to perform an analysis by the application reception unit 422 analyzes the received image data. The image analysis unit 425 passes the analysis result to the application reception unit 422.

Figure 7:
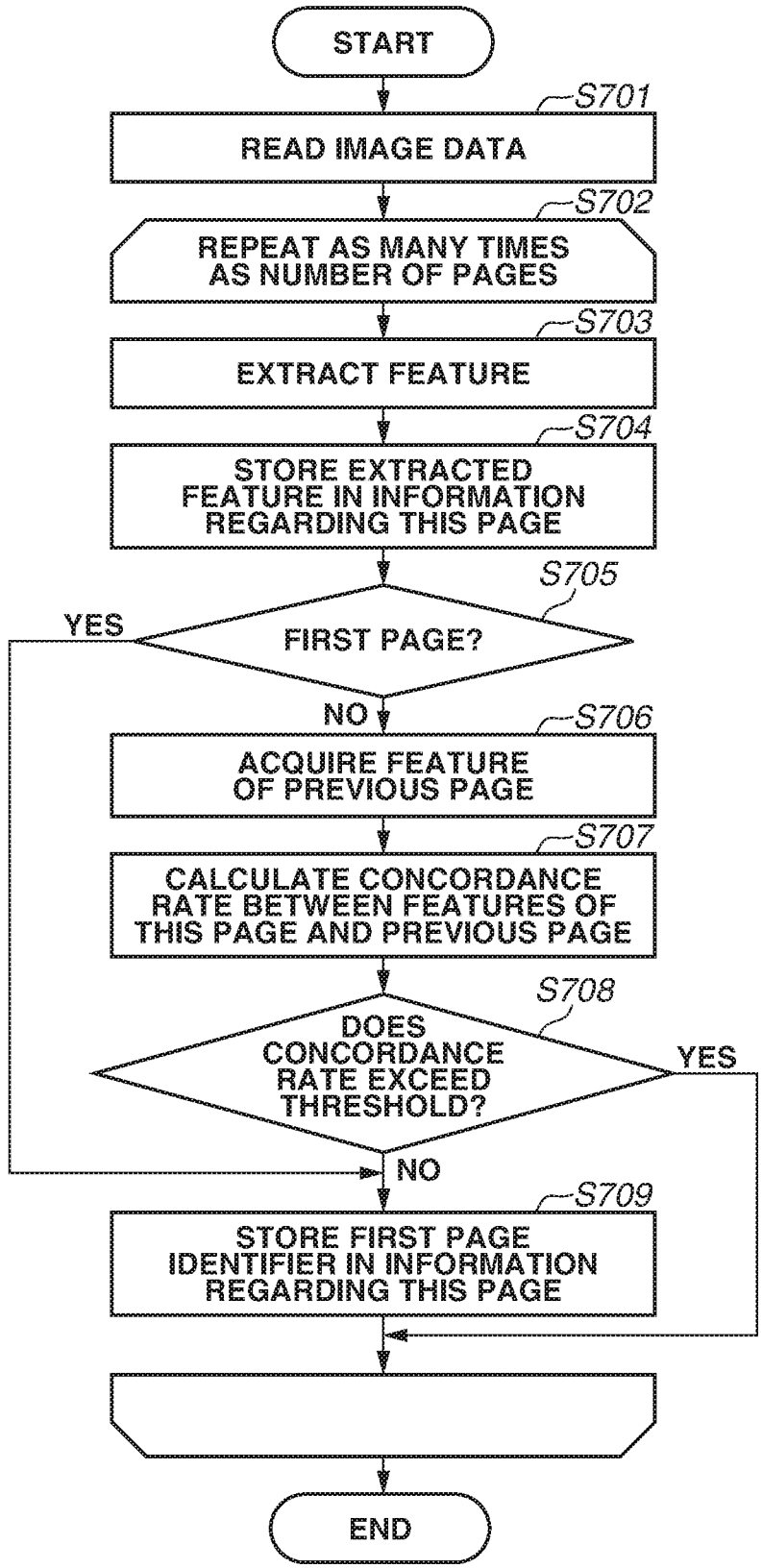
FIG. 7 is a flowchart illustrating a process of analyzing the image data.

With reference to FIG. 7, a description is given of the details of the process of analyzing the image data performed in step S505. FIG. 7 is a flowchart illustrating the details of the process in which the image analysis unit 425 analyzes the image data.

In step S701, the image analysis unit 425 converts the image data including a plurality of pages received from the application reception unit 422 into a form that can be analyzed. Then, the image analysis unit 425 reads the image data. When the image data is read, the image analysis unit 425 makes a correction of the image data by correcting the skew of a shifted document, or by detecting the direction of a document and rotating the document.

In step S702, the image analysis unit 425 repeats the steps of steps S703 to S709 as many times as the number of pages of the read image data (hereinafter, "page image data").

In step S703, the image analysis unit 425 analyzes the content of the page image data corrected in step S701 and extracts a feature amount. In the present exemplary embodiment, the type of the feature amount to be extracted is not restricted. For example, the feature amount may be feature information obtained by converting information such as a character string extracted by performing an optical character recognition (OCR) process on an image into a feature vector using a machine learning engine, or may be feature information regarding the layout of a character string or a rule.

In step S704, the image analysis unit 425 temporarily stores the feature information extracted in step S703 in association with the page image data.

In step S705, the image analysis unit 425 determines whether the page image data corresponds to the first page, i.e., the page image data scanned first.

If it is determined that the page image data corresponds to the first page (Yes in step S705), then in step S709, the image analysis unit 425 stores the page image data in association with a first page identifier.

If it is determined that the page image data does not correspond to the first page (No in step S705), then in step S706, the image analysis unit 425 acquires feature information regarding previous page image data stored in advance.

In step S707, the image analysis unit 425 calculates a concordance rate between the feature of the page image data and the feature of the previous page image data. In the present exemplary embodiment, the method for calculating the concordance rate is not restricted. For example, the image analysis unit 425 causes the machine learning engine to read the features of both the page image data and the previous page image data and calculates the concordance rate based on a keyword or matching of feature patterns of the images. To calculate the concordance rate regarding the keyword, for example, in the case of a contract document, the image analysis unit 425 calculates the concordance rate regarding the keyword for identifying a document, such as a customer name or a contract document number.

In step S708, the image analysis unit 425 determines whether the calculated concordance rate exceeds a threshold. The threshold can be changed or may be set for each feature extraction unit.

If the concordance rate exceeds the threshold (Yes in step S708), the image analysis unit 425 determines that it is highly likely that the page image data belongs to the same document as the previous page image data. Then, the image analysis unit 425 skips step S709.

If, on the other hand, the concordance rate does not exceed the threshold (No in step S708), then in step S709, the image analysis unit 425 determines that it is highly likely that the page image data belongs to a different document from the previous page image data. Then, the image analysis unit 425 stores the page image data in association with a first page identifier. As described above, page image data determined as belonging to a different document is assigned a first page identifier (i.e., information indicating a position separating documents), so that if a plurality of documents is collectively read by an auto sheet feeder, the documents are automatically divided for each document.

While the process of analyzing the image data has been described with reference to FIG. 7, a technique for identifying the first page is not limited to the above technique. For example, a technique for causing a machine learning engine to learn a form on the first page to identify the first page, or a method for detecting a page on which the page number "1" is written in a paper document and determining the detected page as the first page may be used.

The image analysis unit 425 passes, as the analysis result of the image data, the page image data and the first page identifier associated with the page image data to the application transfer unit 424.

Now, returning to the flowchart in FIG. 5, in step S506, the application transfer unit 424 acquires the analysis result of the image data analyzed in step S505 (steps S701 to S709) from the image analysis unit 425 and transfers the analysis result to the document division screen display unit 426.

In step S507, based on the analysis result transferred from the application transfer unit 424, the document division screen display unit 426 displays, on the document division screen via the application display unit 423, a list of thumbnail images (thumbnails) obtained by reducing the page image data.

Figure 8:
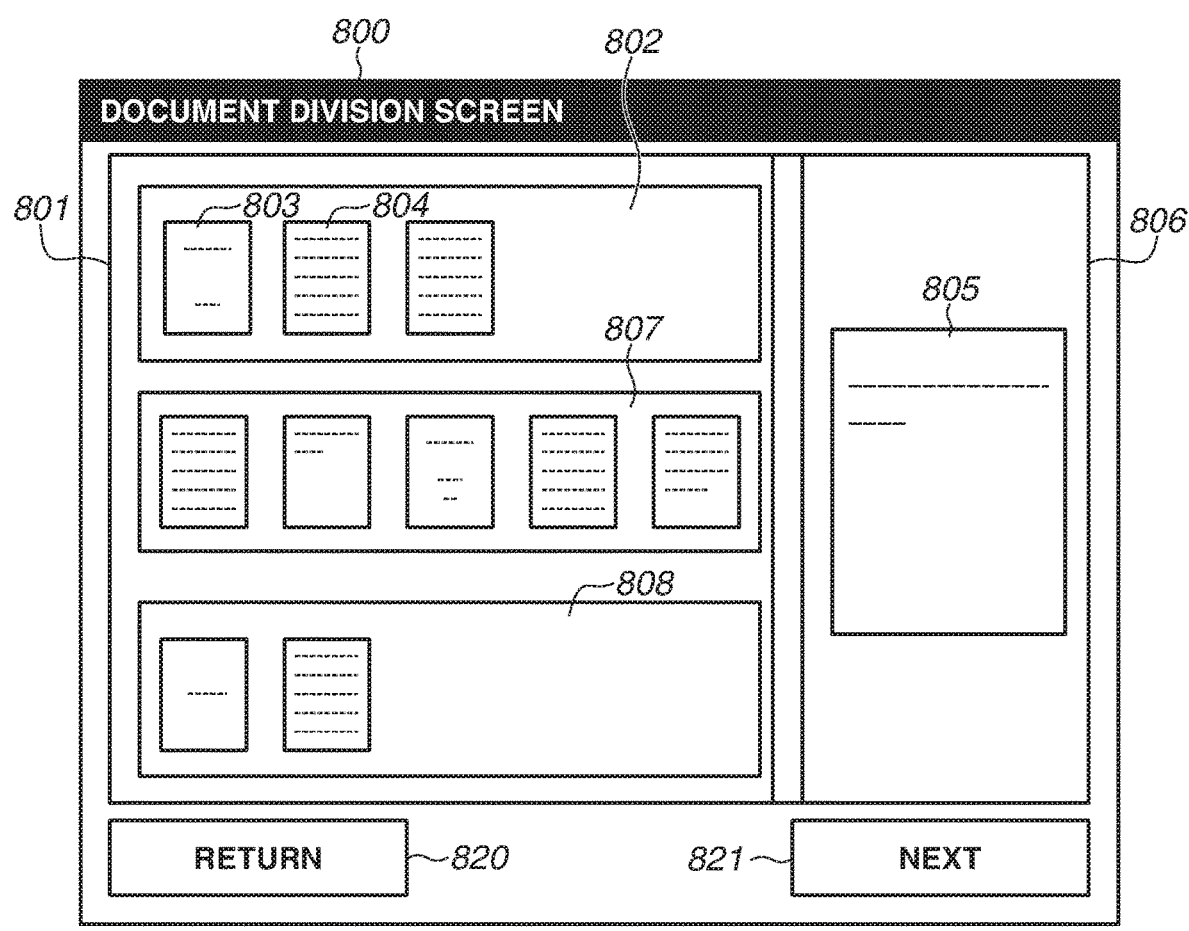
FIG. 8 is a diagram illustrating a document division screen.

With reference to FIG. 8, a document division screen 800 is described. In step S508, the user of the MFP 101 confirms the analysis result in step S505 through the document division screen 800 and corrects the document division setting of the image data to be used in external transfer from the application transfer unit 424 to the file server 102, where necessary.

A document list area 801 is an area where a list of document areas 802, 807, and 808 is displayed. In each document area, thumbnails of page image data determined as belonging to the same document by the analysis process in step S505 are displayed. If the number of document areas (i.e., the number of documents) to be displayed is large, and the document areas cannot be displayed within a screen of the operation unit 220, the document list area 801 can be scrolled by a flick or using a button.

The document areas 802, 807, and 808 are areas where a list of thumbnails (a thumbnail list) associated with the page image data is displayed. When the document division screen is initially displayed, thumbnails are placed according to the analysis result by the image analysis unit 425 acquired in step S506. Thumbnails of the page image data determined as belonging to the same document are arranged in the horizontal direction, and document areas are arranged in the vertical direction. That is, thumbnails of the received page image data are placed in order in the horizontal direction, and every time page image data assigned a first page identifier appears, a new document area is generated and placed as a next document. If the number of page image data determined as belonging to the same document is large, thumbnails of all the pieces of page image data belonging to the document cannot be simultaneously displayed in the display range of a single document area. In this case, however, the thumbnails can be displayed by performing a horizontal scroll operation on the document area by a flick or using a button.

For example, in the case of a thumbnail 803 of page image data that is assigned a first page identifier, the document area 802 is newly generated and placed. Then, a thumbnail 804 of page image data that is not assigned a first page identifier is placed in order in the horizontal direction in the same document area behind the thumbnail 803 of the page image data is assigned the first page identifier. As described above, every time a thumbnail of page image data assigned a first page identifier is identified, each of the document areas 807 and 808 is newly created in the document list area 801.

Hereinafter, a document area of a document previous to a certain document area will be referred to as a "previous document area", and a document area of a document next to the certain document area will be referred to as a "next document area". For example, in a case where the document area 807 is used as a reference, the document area 802 is described as a "previous document area", and the document area 808 is described as a "next document area". A thumbnail can be subjected to a movement operation or a selection operation by a drag-and-drop operation or a tap operation. If the user selects one of the thumbnails, a preview 805 of page image data associated with the selected thumbnail is displayed in a preview area 806. If the user gives an upload instruction, pieces of page image data associated with thumbnails placed within each document area at this time are combined together and converted into an electronic file as a single document for the document area.

Returning to the flowchart in FIG. 5, in step S508, based on a drag-and-drop operation of the user via the document division screen 800, the document division result is corrected. The details of the document division process in step S508 will be described with reference to FIGS. 9 to 12.

Figure 9:
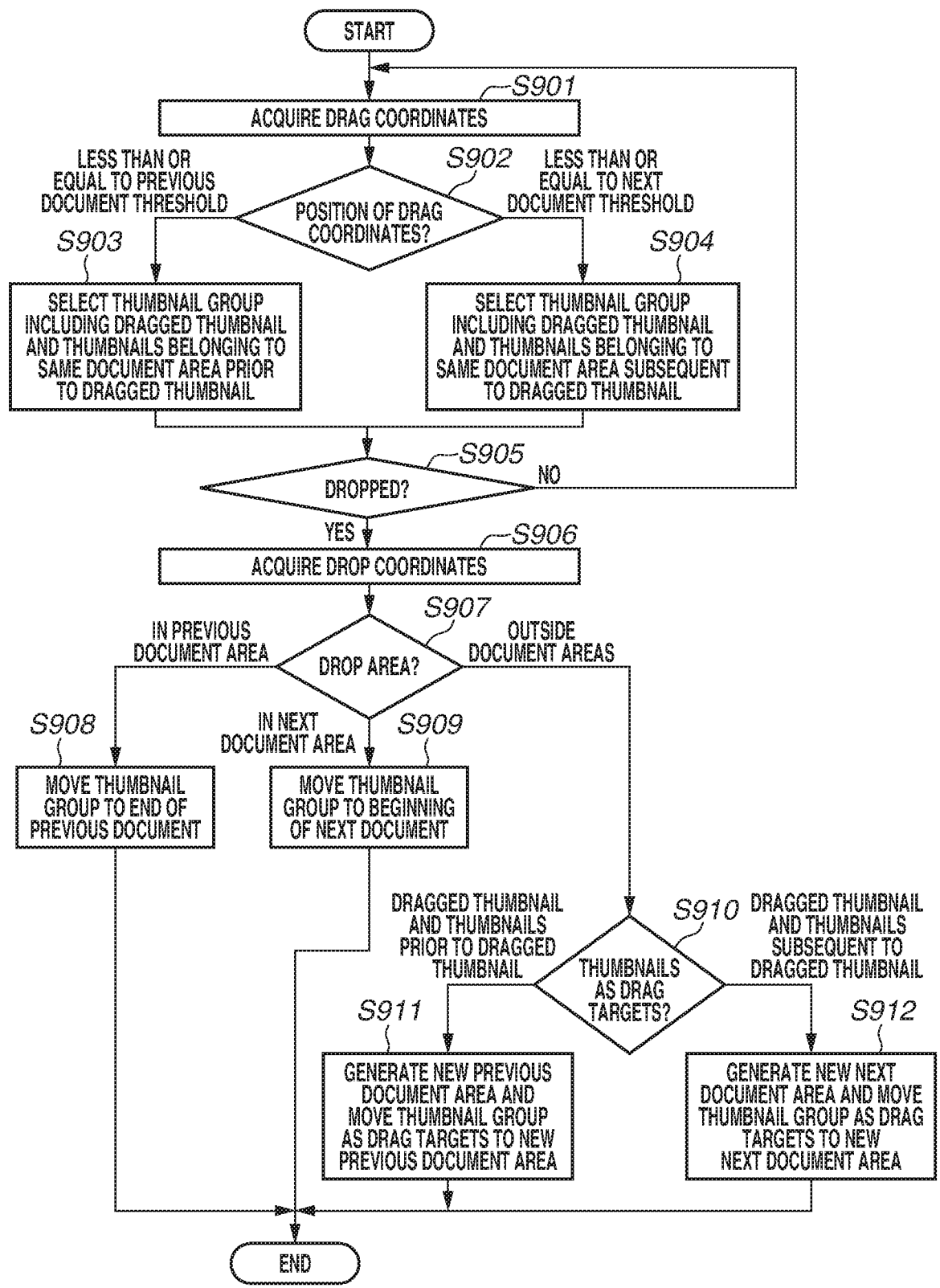
FIG. 9 is a flowchart illustrating a document division process.

FIG. 9 is a flowchart illustrating the document division process through the document division screen display unit 426. The flowchart is started when the user drags one of the thumbnails displayed on the document division screen 800.

Figure 11:
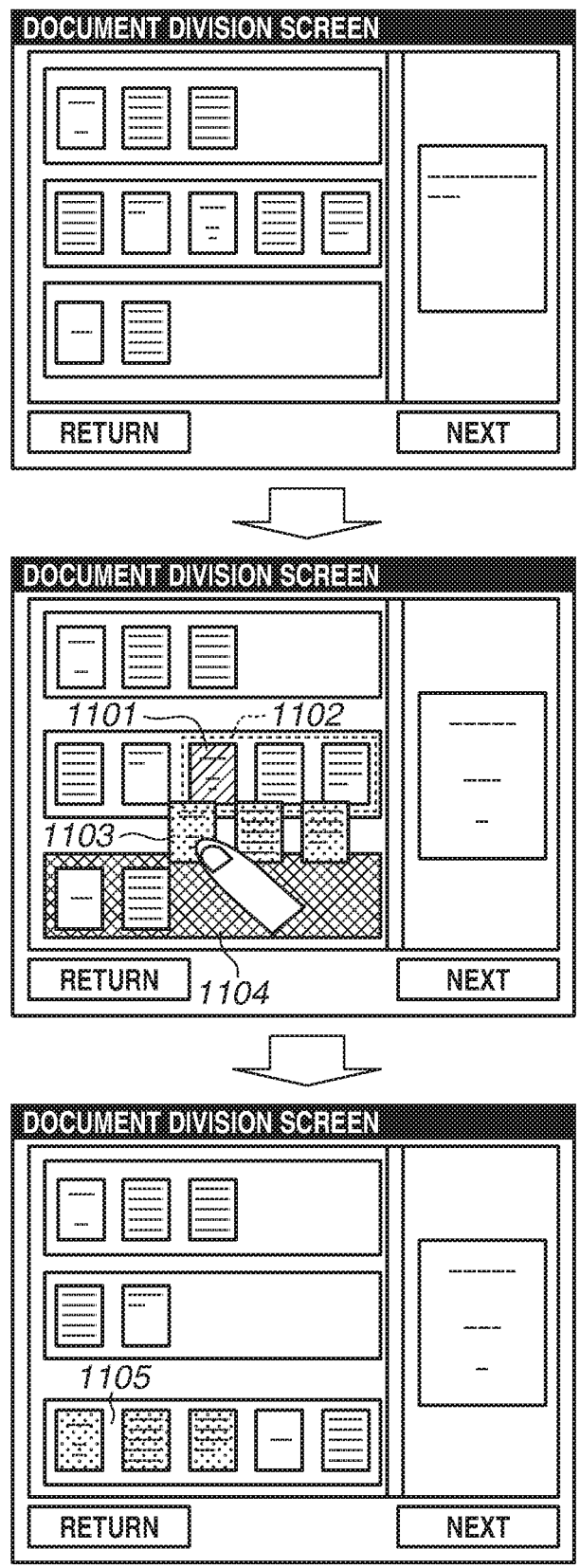
FIG. 11 is a diagram illustrating transitions of screen when the document division process is performed.

FIGS. 10, 11, and 12 are diagrams illustrating the document division processes by the document division screen display unit 426.

In the description, a "dragged thumbnail" refers to one thumbnail that the user starts to drag first. "Thumbnails in a dragged state" refer to one or more thumbnails displayed by following the drag operation of the user (i.e., the position of the finger of the user) during the drag. "Thumbnails as drag targets" refer to one or more thumbnails determined as drag targets according to a direction in which the user drags the thumbnail (i.e., refer to the "dragged thumbnail" and "all thumbnails present in front of or behind the dragged thumbnail" that are displayed in a document area where the drag is started).

In step S901, if the user starts to drag one of thumbnails placed in a document area, the document division screen display unit 426 acquires the coordinates of the current drag position of the drag operation (drag coordinates indicating the touch position of the finger of the user).

In step S902, based on the position of the current drag coordinates, the document division screen display unit 426 determines whether the drag operation is being performed toward the previous document area or performed toward the next document area. More specifically, one of the thumbnails which belongs to a document area has started to be dragged, and the document area is used as a reference, based on which it is determined whether the position of the current drag coordinates is coming close to a document area previous to the reference document area or coming close a document area next to the reference document area. For example, a "previous document threshold" for determining that the thumbnail is dragged toward the previous document area, and a "next document threshold" for determining that that the thumbnail is dragged toward the next document area are provided, and it is determined which of the document thresholds is satisfied.

For example, if the distance between the current drag coordinates and the previous document area is less than or equal to the "previous document threshold" specified in advance, it is determined that the thumbnail is dragged toward the previous document area. Alternatively, the position of a particular area surrounding the previous document area that is larger than a predetermined size may be used as the "previous document threshold". If the current drag coordinates are present in the particular area, it may be determined that the thumbnail is being dragged toward the previous document area. Yet alternatively, the current drag coordinates and the coordinate position where the drag is started may be compared with each other, and if the drag moves the thumbnail by a distance greater than or equal to the "previous document threshold" in the upward direction, it may be determined that the thumbnail is being dragged toward the previous document area.

Similarly, if the distance between the current drag coordinates and the next document area is less than or equal to the "next document threshold" specified in advance, it is determined that the thumbnail is dragged toward the next document area. Alternatively, the position of a particular area surrounding the next document area that is larger than a predetermined size may be used as the "next document threshold". If the current drag coordinates are present in the particular area, it may be determined that the thumbnail is being dragged toward the next document area. Yet alternatively, the current drag coordinates and the coordinate position where the drag is started may be compared with each other, and if the drag moves the thumbnail by a distance greater than or equal to the "next document threshold" in the downward direction, it may be determined that the thumbnail is being dragged toward the next document area.

If it is determined that the current drag coordinates satisfy the previous document threshold (i.e., the thumbnail is dragged toward the previous document area), the processing proceeds to step S903. In step S903, the "dragged thumbnail", and all thumbnails belonging to the document area same as the "dragged thumbnail" and placed in front of the dragged thumbnail are determined as a thumbnail group as drag targets (i.e., a thumbnail group as movement targets). At this time, the thumbnail group determined as the drag targets (the movement targets) among the thumbnails displayed in the document area may be displayed with a frame, or the color of the thumbnail group may be changed so that the user can distinguish the thumbnail group. Even if the number of pages (i.e., the number of thumbnails) is large, and there are thumbnails on pages that cannot be viewed without horizontally scrolling each document area, the dragged thumbnail and all the thumbnails on pages in front of the dragged thumbnail are determined as drag targets in step S903.

For example, in FIG. 10, if the user starts to drag a single thumbnail 1001 and the current drag coordinates move to a position 1003, and when it is determined that the thumbnail 1001 is dragged toward a previous document area, the thumbnail 1001 and all thumbnails belonging to the same document area as the thumbnail 1001 and placed in front of the thumbnail 1001 are determined as movement targets (drag targets), and a frame 1002 is displayed. Further, at the time of the determination, control is performed so that on the left side of the thumbnail 1003 displayed by following the drag operation, the thumbnails on a first side of the thumbnail 1003 which are determined as the movement targets are also displayed by following the drag operation. The thumbnail group to be displayed by following the drag operation may be displayed in a different display form, such as a translucent display.

If, on the other hand, it is determined that the current drag coordinates satisfy the next document threshold (i.e., the thumbnail is dragged toward the next document area), the processing proceeds to step S904. In step S904, the "dragged thumbnail" and all thumbnails belonging to the document area same as the "dragged thumbnail" and placed behind the dragged thumbnail are determined as a thumbnail group as drag targets (i.e., a thumbnail group as movement targets). At this time, the thumbnail group determined as the drag targets (the movement targets) among the thumbnails displayed in the document area may be displayed with a frame, or the color of the thumbnail group may be changed so that the user can distinguish the thumbnail group. Even if the number of pages (i.e., the number of thumbnails) is large, and there are thumbnails on a page that cannot be viewed without horizontally scrolling each document area, the dragged thumbnail and all the thumbnails on the pages behind the dragged thumbnail are determined as drag targets in step S904.

For example, in FIG. 11, if the user starts to drag a single thumbnail 1101 and the current drag coordinates move to a position 1103, and when it is determined that the thumbnail 1101 is dragged toward a next document area the thumbnail 1101 and all thumbnails belonging to the document area same as the thumbnail 1101 and placed behind the thumbnail 1101 are determined as movement targets (drag targets), and a frame 1102 is displayed. Further, at the time of the determination, control is performed so that on the right side of the thumbnail 1103 displayed by following the drag operation, the thumbnails on a second side of the thumbnail 1103 determined as the movement targets are also displayed by following the drag operation. The thumbnail group to be displayed by following the drag operation may be translucently displayed.

In step S905, the document division screen display unit 426 determines whether the thumbnails in the dragged state are dropped by a user operation. If it is determined that the thumbnails in the dragged state are dropped (Yes in step S905), the processing proceeds to step S906. If it is determined that the thumbnails in the dragged state are not dropped (No in step S905), the processing returns to step S901.

In step S906, the document division screen display unit 426 acquires the coordinates (drop coordinates) where the drop operation is performed.

In step S907, the document division screen display unit 426 determines an area where the drop coordinates are dropped.

If it is determined that the thumbnails in the dragged state are dropped in the previous document area, then in step S908, the document division screen display unit 426 moves the thumbnail group as the movement targets (the drag targets) to the end of a thumbnail list placed in the previous document area. For example, in FIG. 10, if the drop coordinates are in a previous document area 1004, the thumbnail group as the movement targets (the thumbnail group surrounded by the frame 1002) is moved to a position (1005) at the end of thumbnails in the previous document area 1004.

If it is determined that the thumbnails in the dragged state are dropped in the next document area, then in step S909, the document division screen display unit 426 moves the thumbnail group as the movement targets (the drag targets) to the beginning of a thumbnail list placed in the next document area. For example, in FIG. 11, if the drop coordinates are in a next document area 1104, the thumbnail group as the movement targets (the thumbnail group surrounded by the frame 1102) is moved to a position (1105) in front of thumbnails in the next document area 1104.

If the drop coordinates are in neither the previous document area nor the next document area, the processing proceeds to step S910. In step S910, the document division screen display unit 426 determines whether the thumbnail group as the movement targets is "the thumbnail group including the dragged thumbnail and the thumbnails in front of the dragged thumbnail" or "the thumbnail group including the dragged thumbnail and the thumbnails behind the dragged thumbnail".

If it is determined that the thumbnail group as the movement targets is "the thumbnail group including the dragged thumbnail and the thumbnails in front of the dragged thumbnail", then in step S911, the document division screen display unit 426 newly generates a previous document area immediately in front of the document area to which the thumbnail group as the movement targets belongs. Then, the document division screen display unit 426 moves the thumbnail group as the movement targets to the newly generated previous document area.

If it is determined that the thumbnail group as the movement targets is "the thumbnail group including the dragged thumbnail and the thumbnails behind the dragged thumbnail", then in step S912, the document division screen display unit 426 newly generates a next document area immediately behind the document area to which the thumbnail group as the movement targets belongs. Then, the document division screen display unit 426 moves the thumbnail group as the movement targets to the newly generated next document area.

For example, in FIG. 12, suppose that the user drags a thumbnail group as movement targets toward a next document area and drops the thumbnail group as the movement targets at a position (1201) between a document area to which the thumbnail group as the movement targets belongs and the next document area. In this case, a next document area 1202 is newly generated immediately behind the document area to which the thumbnail group as the movement targets belongs. Then, the thumbnail group as the movement targets is moved to the newly generated next document area 1202.

During the drag operation, based on the current drag coordinates, a document area to be a movement destination if the thumbnails are dropped at the coordinate position of the current drag coordinates may be displayed so that the user can distinguish the document area. For example, in FIG. 10, if it is determined that the current drag coordinates move to the position 1003 and enter the previous document area, the previous document area corresponds to a document area as a movement destination. Accordingly, the background color of the previous document area is changed to a color 1004. In FIG. 11, if it is determined that the current drag coordinates move to the position 1103 and enter the next document area, the next document area corresponds to a document area as a movement destination. Accordingly, the background color of the next document area is changed to a color 1104. In FIG. 12. if it is determined that the current drag coordinates are located at a position (1201) between the document area to which the thumbnail group as the movement targets belongs and the next document area, the background color of an area between these document areas is changed.

Now, returning to the flowchart in FIG. 5, after the confirmation/correction process on the document division position in step S508 (and FIG. 9) is performed, then in step S509, the document division screen display unit 426 determines whether a "next" key 821 or a "return" key 820 is pressed. If it is determined that the "return" key 820 is pressed, the processing returns to step S501.

If, on the other hand, it is determined that the "next" key 821 is pressed, the document division screen display unit 426 passes document division information as the processing result of step S508 to the application display unit 423, and the processing proceeds to step S510. The "document division information" refers to information obtained by grouping the page image data for each document area when the "next" key 821 is pressed, based on page image data associated with thumbnails placed in each document area. For example, the document division information is information obtained by assigning the same file ID to identifiers of the page image data belonging to the same document area. The group of the page image data assigned the same file ID will be combined together and converted to an electronic file by an electronic file conversion process described below.

Figure 13:
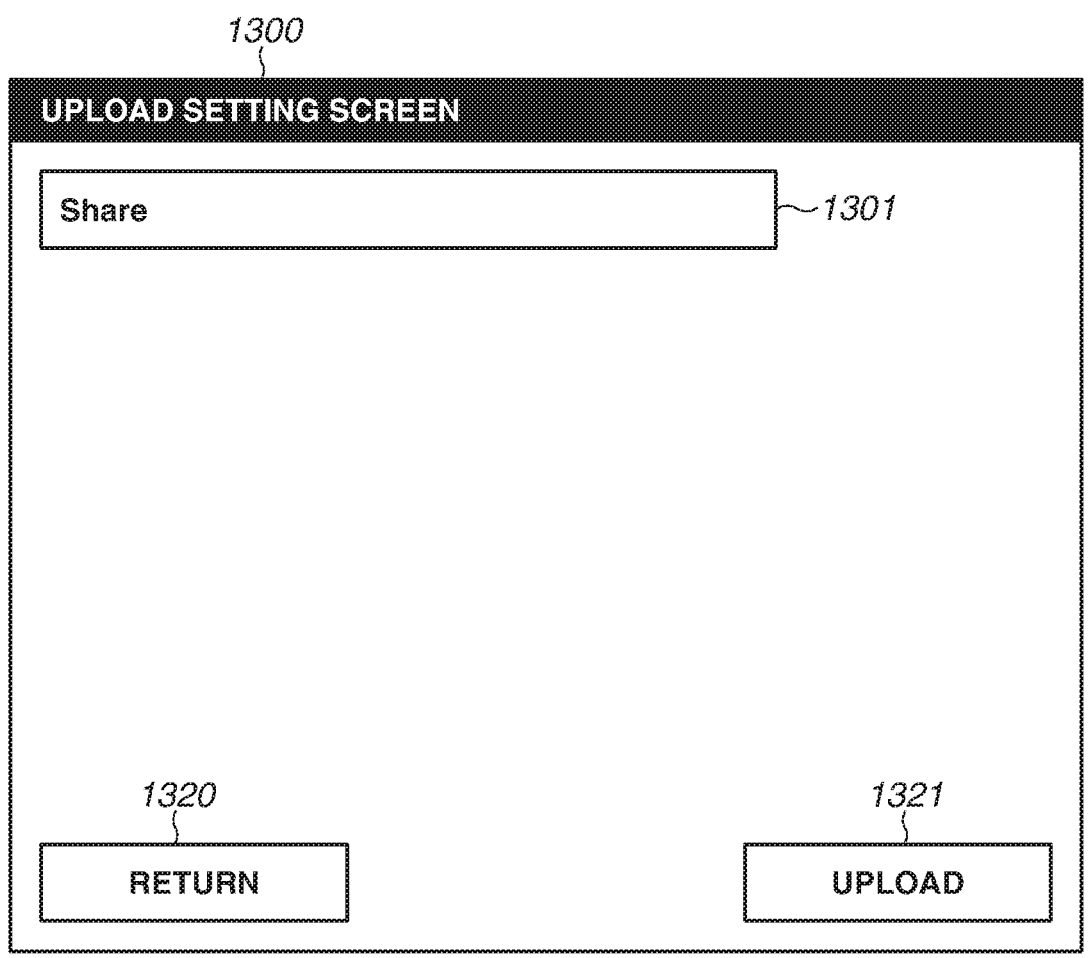
FIG. 13 is a diagram illustrating an upload setting screen.

In step S510, the upload instruction unit 427 displays an upload setting screen 1300. With reference to FIG. 13, the upload setting screen 1300 is described.

The user of the MFP 101 sets an upload destination (sets an external transfer destination) on the upload setting screen 1300, and the application transfer unit 424 executes the process of uploading files to the file server 102 as the set upload destination.

In a folder path entry field 1301, a folder path to the external transfer destination (e.g., a folder path to a folder desired by the user in the file server 102) is set. For example, if the user taps the folder path entry field 1301, the upload instruction unit 427 displays a keyboard screen (not illustrated). Through the keyboard screen, the user sets a folder path to a server as the external transfer destination when the application transfer unit 424 uploads files. The folder path may be set not only by input through the keyboard screen, but also, for example, set using an address book held in the MFP 101. On the upload setting screen 1300 in FIG. 13, if a user ID and a password of the external transfer destination are required (e.g., are not yet set) to access the external transfer destination, setting items for inputting the user ID and the password maybe present.

Now, returning to the flowchart in FIG. 5, in step S511, the upload instruction unit 427 determines whether an "upload" key 1321 or a "return" key 1320 is pressed on the upload setting screen 1300 in FIG. 13. If it is determined that the "return" key 1320 is pressed, the processing returns to step S507.

If, on the other hand, it is determined that the "upload" key 1321 is pressed, the upload instruction unit 427 passes the folder path setting made in FIG. 13 to the application display unit 423, and the processing proceeds to step S512.

In step S512, according to the document division information received from the document division screen display unit 426, the application display unit 423 generates electronic files for each document and passes the generated electronic file group and the folder path setting to the application transfer unit 424.

In step S513, the application transfer unit 424 acquires setting information regarding the file server 102 (file server settings) set in advance. In the file server settings, a host name required to store the files in the file server 102, the starting point of the folder path to store the electronic files, and a user name and a password for logging into the file server 102 are described.

In step S514, the application transfer unit 424 creates an electronic file storage location path as the storage location of the electronic file group. The electronic file storage location path is created by adding a file name to the received host name and folder path. In the present exemplary embodiment, the method for generating the file name is not limited to the above. For example, a character string indicating the date and time of transmission, a character string obtained by performing a character recognition process on the image data, or a character string acquired by input of the user can be used as the file name.

In step S515, the application transfer unit 424 accesses the file server 102. At this time, the application transfer unit 424 transmits the user name and the password included in the file server settings acquired in step S513 to the file server 102 and receives the result of authentication by the file server 102.

In step S516, the application transfer unit 424 determines whether the authentication is successful (whether the user has logged into the file server 102). If the authentication is successful (Yes in step S516), the processing proceeds to step S517. If the authentication is failed (No in step S516), the processing ends.

In step S517, the application transfer unit 424 externally transfers the electronic files of the respective documents to a folder indicated by the image data storage location path created in step S514 and stores the electronic files in the folder.

A second exemplary embodiment is described below. In the first exemplary embodiment, all thumbnails of the page image data displayed in a document area are displayed in the same size. The present disclosure, however, is not limited to that embodiment. To facilitate the distinction of the types of divided documents, a thumbnail on the first page in each document area may be displayed larger than thumbnails of other pages. Further, a single thumbnail selected first as a drag target by the user may be displayed in an enlarged manner when selected by a touch.

Figure 14:
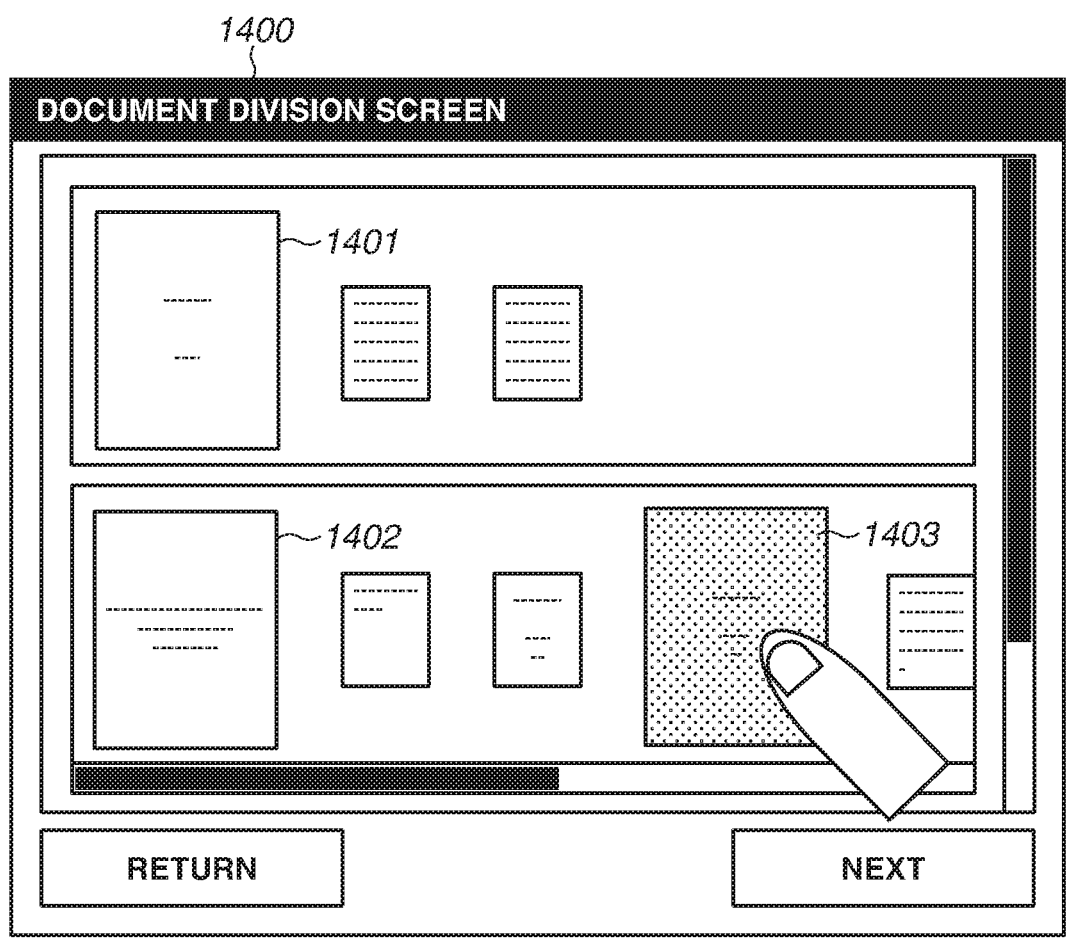
FIG. 14 is a diagram illustrating a thumbnail enlargement process.

FIG. 14 illustrates an example of a document division screen 1400 on which a thumbnail of the first page and a thumbnail of a page that starts to be dragged are displayed in an enlarged manner. When the document division screen 1400 is initially displayed, thumbnails 1401 and 1402 on the first pages are displayed in a size larger than thumbnails on other pages. Further, if one of the pages is selected by a user operation such as a tap or a click, a thumbnail 1403 of the selected page is displayed in an enlarged manner. When the user touches a thumbnail on a page to correct a division position between documents, the thumbnail 1403 on the page is displayed in an enlarged manner. Thus, it is easy to distinguish whether the page as the selection target is a desired page. If the page as the selection target is the desired page, the user can easily perform a drag operation on the touched thumbnail immediately after the touch to move the thumbnail to a previous document area or a next document area, to create a new document area.

Other Embodiments

As the image processing apparatus (the electronic file generation apparatus) according to the first and second exemplary embodiments, an MFP is used. The present disclosure, however, is not limited to these embodiments. Alternatively, a single-function apparatus having a scanner function may be used.

In the first exemplary embodiment, in step S517, the generated electronic files are transferred to the external file server. The present disclosure, however, is not limited to this embodiment. Alternatively, the generated electronic files may be saved in a folder in the apparatus having performed the division process.

According to the above exemplary embodiments, the operability is improved when a plurality of thumbnails among a displayed list of thumbnails is moved by a drag-and-drop operation of a user.

Other Embodiments

Embodiment(s) of the present disclosure also be realized by a computer of a system or apparatus that reads out and executes computer executable instructions e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the some embodiments are not limited to the disclosed exemplary embodiments. The scope of the following claims is to be accorded the broadest interpretation so as to encompass all such modifications and equivalent structures and functions.

This application claims the benefit of Japanese Patent Application No. 2018-225481, filed Nov. 30, 2018, which is hereby incorporated by reference herein in its entirety.

What is claimed is:

1. A device comprising:
at least one memory storing instructions; and
at least one processor that executes the instructions stored in the memory and configured to perform:
reading a plurality of documents to obtain image data of a plurality of pages;
dividing, based on the image data of the plurality of pages obtained, the image data of the plurality of pages into groups of the documents;
displaying an operation screen that includes;

a plurality of document areas corresponding respectively to the divided groups of the documents, wherein each document area corresponds to a different row, the document areas are arranged on the operation screen sequentially in a vertical order, and the operation screen includes at least a first document area that corresponds to a first document, and thumbnails of a plurality of pages that constitute a corresponding document of the plurality of documents, wherein the thumbnails are arranged in each of the document areas sequentially in a horizontal order;

receiving a drag-and-drop operation of a first thumbnail that is one of a plurality of thumbnails included in the first document area, wherein the first thumbnail is preceded by and succeeded by at least one thumbnail in a row corresponding to the first document area;

in a case where the first thumbnail is dragged and dropped onto a second document area that precedes the first document area, automatically determining that first movement targets consist of the first thumbnail and thumbnails that precede the first thumbnail in the row and moving only the first movement targets, among the plurality of thumbnails included in the first document area, into an end of the second document area; and in a case where the first thumbnail is dragged and dropped onto a third document area that succeeds the first document area, automatically determining that second movement targets consist of the first thumbnail and thumbnails that succeed the first thumbnail in the row and moving only the second movement targets, among the plurality of thumbnails included in the first document area, into a beginning of the third document area.

2. The device according to claim 1, wherein the processor further performs:

in a case where the first thumbnail is dragged toward the second document area, an operation for displaying, at the dragged position, an image corresponding to the first movement targets consisting of the first thumbnail and the thumbnails that precede the first thumbnail in the row, among the plurality of thumbnails included in the first document area; and in a case where the first thumbnail is dragged toward the third document area, an operation for displaying, at the dragged position, an image corresponding to the second movement targets consisting of the first thumbnail and the thumbnails that succeed the first thumbnail in the row, among the plurality of thumbnails included in the first document area.

3. The device according to claim 1, wherein the processor further performs:

in a case where a position to which the first thumbnail has been dragged is positioned within a predetermined distance from the second document area, an operation for displaying, at the dragged position, an image corresponding to the first movement targets consisting of the first thumbnail and the thumbnails that precede the first thumbnail in the row, among the plurality of thumbnails included in the first document area; and in a case where a position to which the first thumbnail has been dragged is positioned within a predetermined distance from the third document area, an operation for displaying, at the dragged position, an image corresponding to the second movement targets consisting of the first thumbnail and the thumbnails succeed the first thumbnail in the row, among the plurality of thumbnails included in the first document area.

4. The device according to claim 1, wherein the first document area is an area corresponding to the first document and includes thumbnails of a plurality of pages included in the first document, wherein the second document area is an area corresponding to a second document and includes thumbnails of a plurality of pages included in the second document, and wherein the third document area is an area corresponding to a third document and includes thumbnails of a plurality of pages included in the third document.

5. The device according to claim 1, wherein the processor further performs:

in a case where the first thumbnail is dragged and dropped between the first and second document areas, generating a new document area between the first and second document areas, automatically determining that third movement targets consist of the first thumbnail and the thumbnails that precede the first thumbnail in the row, and moving only the third movement targets, among the plurality of thumbnails included in the first document area, to the generated new document area.

6. The device according to claim 1, wherein the processor further performs:

in a case where the first thumbnail is dragged and dropped between the first and third document areas, generating a new area between the first and third document areas, automatically determining that fourth movement targets consist of the first thumbnail and the thumbnails that succeed the first thumbnail in the row, and moving only the fourth movement targets, among the plurality of thumbnails included in the first document area, to the generated new document area.

7. The device according to claim 1, wherein execution of the stored instruction further configures the processor to perform:

an operation for receiving the image data of the plurality of pages obtained by scanning the plurality of documents;

an operation for dividing the image data of the plurality of pages for each document based on a feature amount of each page extracted from the image data of the plurality of pages; and an operation for displaying the thumbnails of the plurality of pages that constitute each corresponding document in a list in an area corresponding to each of the divided groups of the documents.

8. The device according to claim 7, wherein the feature amount includes at least one of a keyword, a feature pattern of an image, a form on a first page, and a page number.

9. The device according to claim 1, wherein the first, second, and third document areas are different areas.

10. The device according to claim 1, wherein the device is an electronic file generation apparatus.

11. The device according to claim 4, wherein among the thumbnails of the plurality of pages included in each of the first, second, and third document areas, a thumbnail of a first page in each document area is displayed larger than the other thumbnails included in each respective document area.

12. A method executed by a device, the method comprising:

reading a plurality of documents to obtain image data of a plurality of pages;

dividing, based on the image data of the plurality of pages obtained, the image data of the plurality of pages into groups of the documents;

displaying an operation screen that includes:

a plurality of document areas corresponding respectively to the divided groups of the documents, wherein each document area corresponds to a different row, the document areas are arranged on the operation screen sequentially in a vertical order, and the operation screen includes at least a first document area that corresponds to a first document, and thumbnails of a plurality of pages that constitute a corresponding one of the plurality of documents, wherein the thumbnails are arranged in each of the document areas sequentially in a horizontal order;

receiving a drag-and-drop operation of a first thumbnail that is one of a plurality of thumbnails included in the first document area, wherein the first thumbnail is preceded by and succeeded by at least one thumbnail in a row corresponding to the first document area;

in a case where the first thumbnail is dragged and dropped onto a second document area that precedes the first document area, automatically determining that first movement targets consist of the first thumbnail and thumbnails that precede the first thumbnail in the row and moving only the first movement targets, among the plurality of thumbnails included in the first document area, into an end of the second document area; and in a case where the first thumbnail is dragged and dropped onto a third document area that succeeds the first document area, automatically determining that second movement targets consist of the first thumbnail and thumbnails that succeed the first thumbnail in the row and moving only the second movement targets, among the plurality of thumbnails included in the first document area, into a beginning of the third document area.

13. A non-transitory computer-readable storage medium storing a program executed by a computer of a device, wherein the program causes the computer to perform operations comprising:

reading a plurality of documents to obtain image data of a plurality of pages;

dividing, based on the image data of the plurality of pages obtained, the image data of the plurality of pages into groups of the documents;

displaying an operation screen that includes:

a plurality of document areas corresponding respectively to the divided groups of the documents, wherein each document area corresponds to a different row, the document areas are arranged on the operation screen sequentially in a vertical order, and the operation screen includes at least a first document area that corresponds to a first document, and thumbnails of a plurality of pages that constitute a corresponding one of the plurality of documents, wherein the thumbnails are arranged in each of the document areas sequentially in a horizontal order;

receiving a drag-and-drop operation of a first thumbnail that is one of a plurality of thumbnails included in the first document area, wherein the first thumbnail is preceded by and succeeded by at least one thumbnail in a row corresponding to the first document area;

in a case where the first thumbnail is dragged and dropped onto a second document area that precedes the first document area, automatically determining that first movement targets consist of the first thumbnail and thumbnails that precede the first thumbnail in the row and moving only the first movement targets, among the plurality of thumbnails included in the first document area, into an end of the second document area; and in a case where the first thumbnail is dragged and dropped onto a third document area that succeeds the first document area, automatically determining that second movement targets consist of the first thumbnail and thumbnails that succeed the first thumbnail in the row and moving only the second movement targets, among the plurality of thumbnails included in the first document area, into a beginning of the third document area.

* * * * *